(12) United States Patent
Oh et al.

(10) Patent No.: US 12,067,972 B2
(45) Date of Patent: Aug. 20, 2024

(54) ELECTRONIC DEVICE AND OPERATION METHOD THEREOF

(71) Applicant: Samsung Electronics Co., Ltd., Suwon-si (KR)

(72) Inventors: Junkwang Oh, Suwon-si (KR); Hosik Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 17/532,320

(22) Filed: Nov. 22, 2021

(65) Prior Publication Data

US 2022/0189463 A1 Jun. 16, 2022

Related U.S. Application Data

(63) Continuation of application No. PCT/KR2021/016589, filed on Nov. 15, 2021.

(30) Foreign Application Priority Data

Dec. 16, 2020 (KR) .................. 10-2020-0176564

(51) Int. Cl.
*G10L 15/26* (2006.01)
*G10L 15/02* (2006.01)
*G10L 15/06* (2013.01)
*G10L 15/14* (2006.01)
*G10L 15/22* (2006.01)
*G10L 15/30* (2013.01)

(52) U.S. Cl.
CPC ............ *G10L 15/063* (2013.01); *G10L 15/02* (2013.01); *G10L 15/22* (2013.01); *G10L 15/30* (2013.01); *G10L 2015/0638* (2013.01)

(58) Field of Classification Search
CPC .......... G10L 15/22; G10L 15/14; G10L 15/26
See application file for complete search history.

(56) References Cited

U.S. PATENT DOCUMENTS

| | | | |
|---|---|---|---|
| 7,912,206 B2 | 3/2011 | Miller et al. | |
| 7,991,129 B2 | 8/2011 | Timmins et al. | |
| 8,111,812 B2 | 2/2012 | Timmins et al. | |
| 8,296,142 B2 | 10/2012 | Lloyd et al. | |
| 8,396,709 B2 | 3/2013 | Lloyd et al. | |
| 8,457,299 B2 | 6/2013 | Miller et al. | |

(Continued)

FOREIGN PATENT DOCUMENTS

| | | | | |
|---|---|---|---|---|
| CN | 106782521 A | * | 5/2017 | |
| CN | 107910008 A | * | 4/2018 | ........... G10L 15/144 |

(Continued)

OTHER PUBLICATIONS

International Search Report dated Mar. 2, 2022, issued in International Application No. PCT/KR2021/016589.

*Primary Examiner* — Shreyans A Patel
(74) *Attorney, Agent, or Firm* — Jefferson IP Law, LLP

(57) ABSTRACT

An electronic device is provided. The electronic device includes a processor and a memory operatively connected to the processor. The memory may store instructions that, when executed, cause the processor to receive a voice input of a user, to extract a feature from the voice input of the user, to select an acoustic model through comparison with the extracted feature, and to learn the feature of the voice input by performing fine-tuning on the selected acoustic model.

20 Claims, 13 Drawing Sheets

(56) References Cited

U.S. PATENT DOCUMENTS

| | | |
|---|---|---|
| 10,515,626 B2 | 12/2019 | Li et al. |
| 10,930,268 B2 | 2/2021 | Yoo et al. |
| 11,257,485 B2 | 2/2022 | Li et al. |
| 2006/0023849 A1 | 2/2006 | Timmins et al. |
| 2018/0061409 A1* | 3/2018 | Valentine ............. G10L 15/22 |
| 2019/0371301 A1 | 12/2019 | Yoo et al. |
| 2020/0202844 A1* | 6/2020 | Lee ..................... G06N 7/01 |
| 2021/0280173 A1 | 9/2021 | Shon et al. |
| 2022/0051661 A1* | 2/2022 | Park ................... G10L 15/26 |

FOREIGN PATENT DOCUMENTS

| | | | | |
|---|---|---|---|---|
| CN | 108877784 A | * | 11/2018 | ............. G10L 15/14 |
| CN | 108877784 B | * | 12/2022 | ............. G10L 15/14 |
| JP | 09-258769 A | | 10/1997 | |
| JP | 2002082688 A | * | 3/2002 | |
| JP | 2011013543 A | * | 1/2011 | |
| JP | 2020086034 A | * | 6/2020 | |
| JP | 2020140029 A | * | 9/2020 | |
| KR | 10-2008-0056571 A | | 6/2008 | |
| KR | 10-2010-0101986 A | | 9/2010 | |
| KR | 10-2013-0133832 A | | 12/2013 | |
| KR | 10-2018-0095886 A | | 8/2018 | |
| KR | 10-2019-0008137 A | | 1/2019 | |
| KR | 20190094315 A | * | 8/2019 | |
| KR | 10-2019-0109651 A | | 9/2019 | |
| KR | 10-2019-0136578 A | | 12/2019 | |
| KR | 10-2020-0056342 A | | 5/2020 | |
| KR | 10-2020-0092501 A | | 8/2020 | |
| WO | WO-2017034536 A1 | * | 3/2017 | ............. G10L 15/22 |

\* cited by examiner

ELECTRONIC DEVICE AND OPERATION METHOD THEREOF

CROSS-REFERENCE TO RELATED APPLICATION(S)

This application is a continuation application, claiming priority under § 365(c), of an International application No. PCT/KR2021/016589, filed on Nov. 15, 2021, which is based on and claims the benefit of a Korean patent application number 10-2020-0176564, filed on Dec. 16, 2020, in the Korean Intellectual Property Office, the disclosure of which is incorporated by reference herein in its entirety.

TECHNICAL FIELD

The disclosure relates to an electronic device and an operating method thereof.

BACKGROUND ART

Nowadays, various electronic devices may convert a text into a voice so as to be output by installing a text-to-speech (TTS) function that synthesizes voices. To provide the TTS function, an electronic device may use a TTS model including a phoneme of a text and voice data corresponding to the phoneme.

With the development of a technology of artificial intelligence (AI) in a technology field of voice synthesis or video synthesis, there is an increasing need for artificial composites that are very similar to the voice or shape of a real person.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a method and device for providing a personalized voice.

Another aspect of the disclosure is to provide a method and device for providing a personalized voice by using a small amount of input data.

Another aspect of the disclosure is to provide a method and device for providing a user with a consistent user experience by using only a small amount of input data.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a processor and a memory operatively connected to the processor. The memory may store instructions that, when executed, cause the processor to receive a voice input of a user, to extract a feature from the voice input of the user, to select an acoustic model through comparison with the extracted feature, and perform fine-tuning on the selected acoustic model so that the selected acoustic model learns the feature of the voice input.

In accordance with another aspect of the disclosure, a method performed by an electronic device is provided. The method includes receiving a voice input of a user, extracting a feature from the voice input of the user, selecting an acoustic model through comparison with the extracted feature, and performing fine-tuning on the selected acoustic model so that the selected acoustic model learns the feature of the voice input.

Advantageous Effects

According to the embodiments disclosed in this specification, it is possible to provide a method and device for synthesizing voice data personalized with a user's voice, by using only a small amount of voice data of the user.

According to the embodiments disclosed in this specification, it is possible to provide a method and device that provides personalized voice data by learning the user's voice, while minimizing the user's inconvenience by grasping frequency of usage of the user.

Besides, a variety of effects directly or indirectly understood through the specification may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
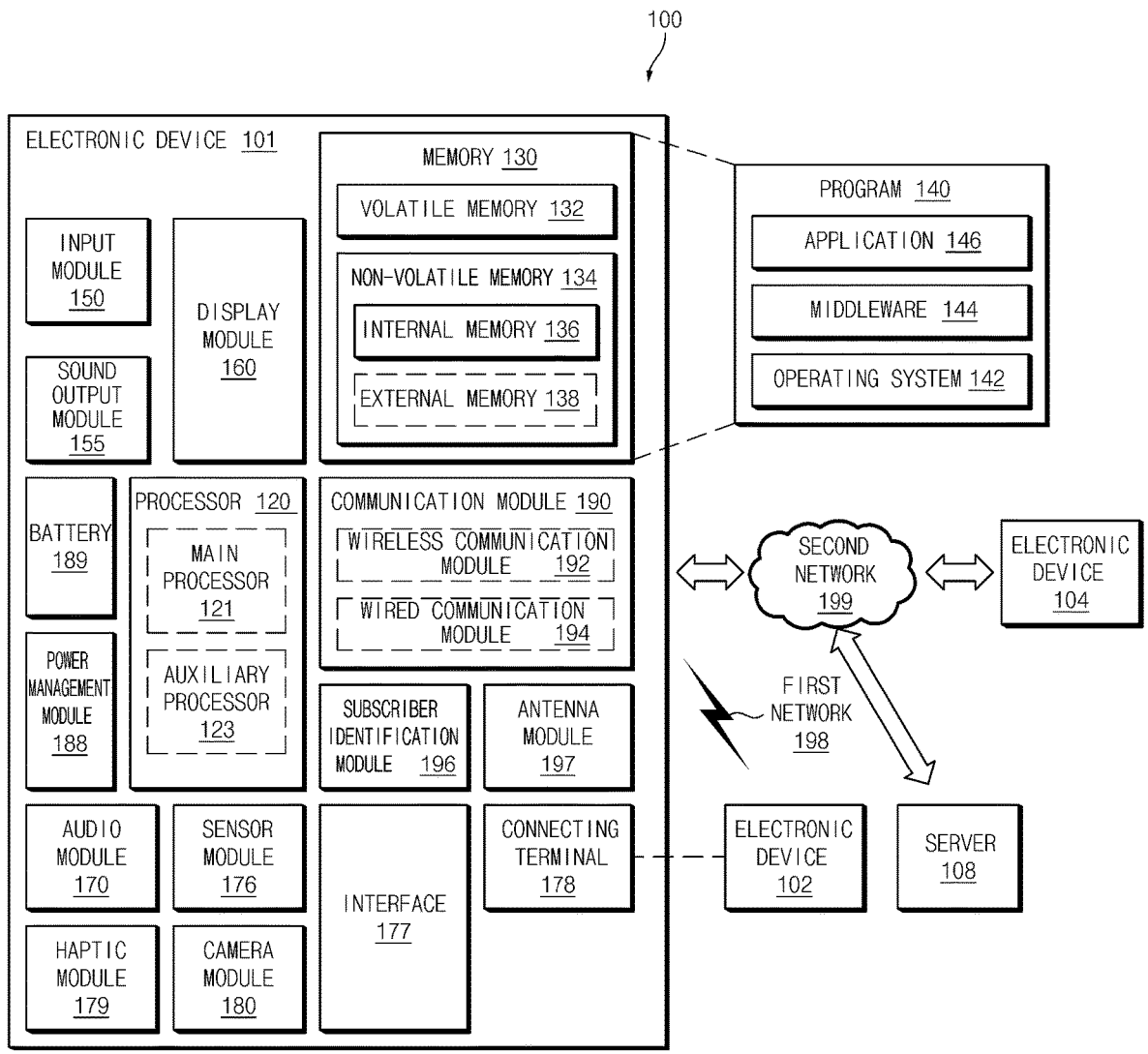
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
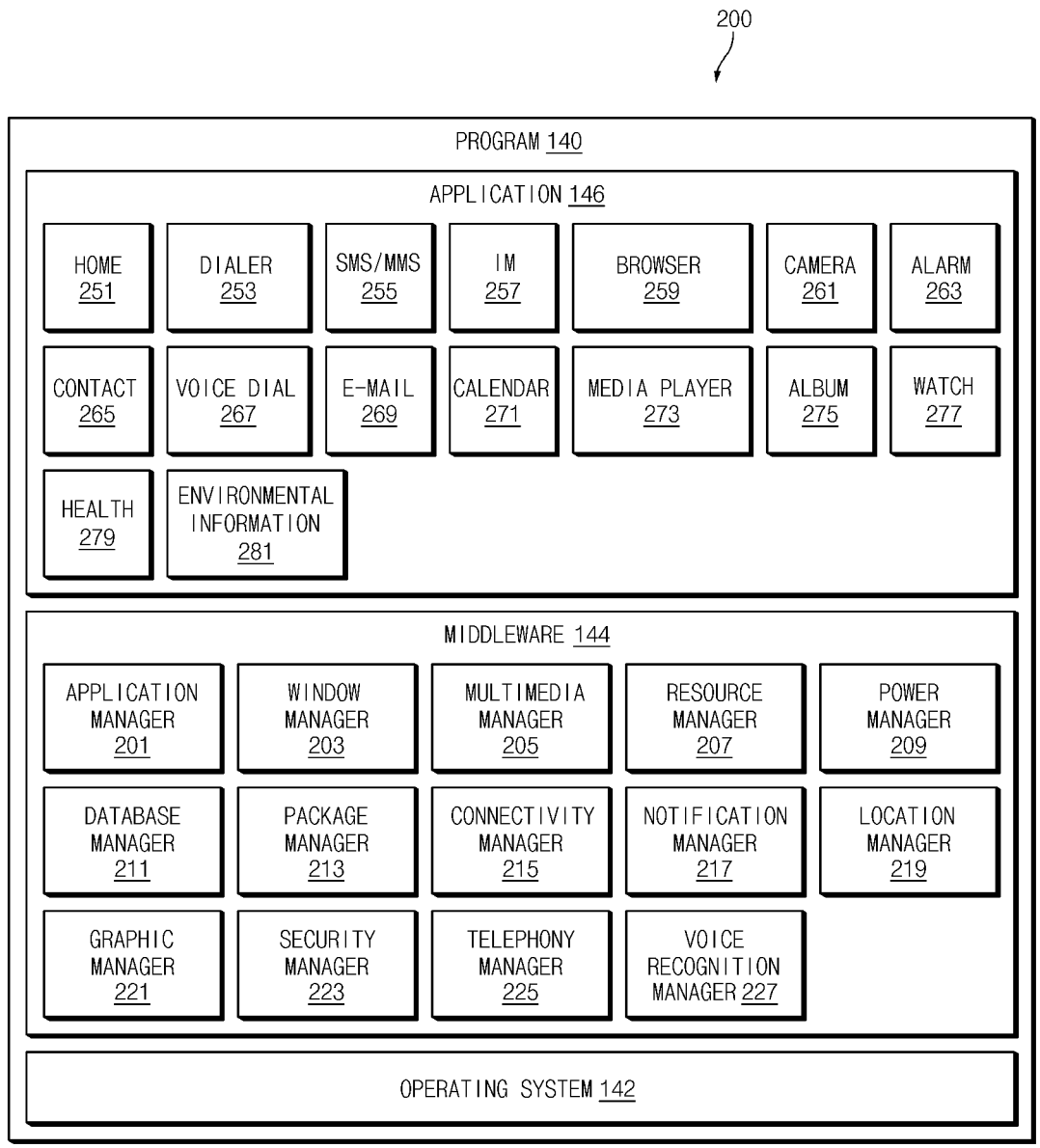
FIG. 2 is a block diagram of a program, according to an embodiment of the disclosure.

FIG. 2 is a block diagram illustrating a program according to an embodiment of the disclosure.

Referring to FIG. 2, in a block diagram 200, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™ At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module (or device) 150, the sound output device 155, the display module (or device) 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice dial 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
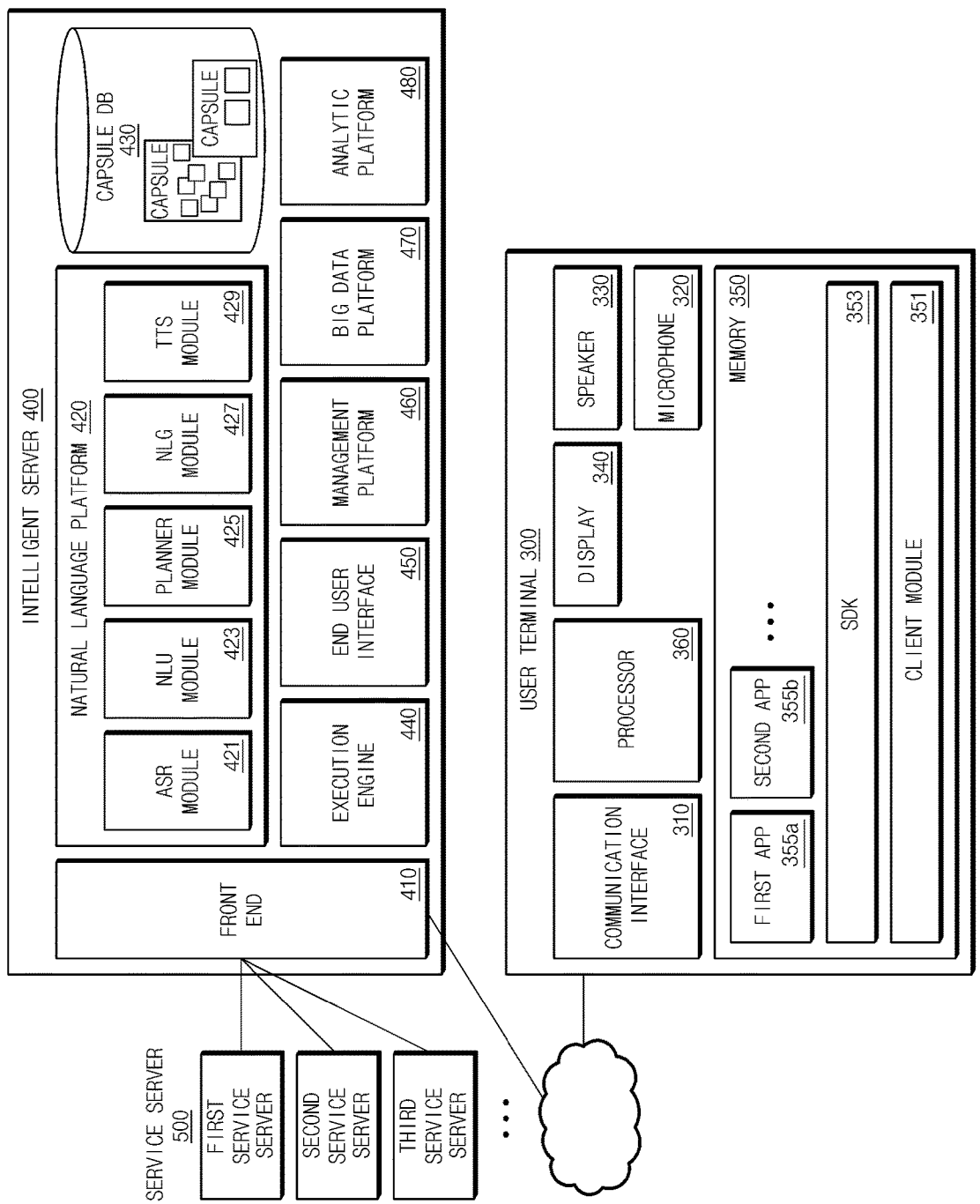
FIG. 3 is a block diagram illustrating an integrated intelligence system, according to an embodiment of the disclosure.

FIG. 3 is a block diagram illustrating an integrated intelligence system, according to an embodiment of the disclosure.

Referring to FIG. 3, an integrated intelligence system according to an embodiment may include a user terminal 300, an intelligence server 400, and a service server 500.

The user terminal 300 according to an embodiment may be a terminal device (or an electronic device) capable of connecting to Internet, and may be, for example, a mobile phone, a smartphone, a personal digital assistant (PDA), a notebook computer, a television (TV), a white household appliance, a wearable device, a head mounted display (HID), or a smart speaker.

According to the illustrated embodiment, the user terminal 300 may include a communication interface 310, a microphone 320, a speaker 330, a display 340, a memory 350, or a processor 360. The listed components may be operatively or electrically connected to one another.

The communication interface 310 according to an embodiment may be connected to an external device and may be configured to transmit or receive data to or from the external device. The microphone 320 according to an embodiment may receive a sound (e.g., a user utterance) to convert the sound into an electrical signal. The speaker 330 according to an embodiment may output the electrical signal as sound (e.g., voice). The display 340 according to an embodiment may be configured to display an image or a video. The display 293 according to an embodiment may display the graphic user interface (GUI) of the running app (or an application program).

The memory 350 according to an embodiment may store a client module 351, a software development kit (SDK) 353, and a plurality of apps 355. The client module 351 and the SDK 353 may constitute a framework (or a solution program) for performing general-purposed functions. Furthermore, the client module 351 or the SDK 353 may constitute the framework for processing a voice input.

The plurality of apps 355 may be programs for performing a specified function. According to an embodiment, the plurality of apps 355 may include a first app 355a and/or a second app 355b. According to an embodiment, each of the plurality of apps 355 may include a plurality of actions for performing a specified function. For example, the apps may include an alarm app, a message app, and/or a schedule app. According to an embodiment, the plurality of apps 355 may be executed by the processor 360 to sequentially execute at least part of the plurality of actions.

According to an embodiment, the processor 360 may control overall operations of the user terminal 300. For example, the processor 360 may be electrically connected to the communication interface 310, the microphone 320, the speaker 330, and the display 340 so as to perform a specified operation. For example, the processor 360 may include at least one processor.

Moreover, the processor 360 according to an embodiment may execute the program stored in the memory 350 so as to perform a specified function. For example, according to an embodiment, the processor 360 may execute at least one of the client module 351 or the SDK 353 so as to perform a following operation for processing a voice input. The processor 360 may control operations of the plurality of apps 355 via the SDK 353. The following actions described as the actions of the client module 351 or the SDK 353 may be the actions performed by the execution of the processor 360.

According to an embodiment, the client module 351 may receive a voice input. For example, the client module 351 may receive a voice signal corresponding to a user utterance detected through the microphone 320. The client module 351 may transmit the received voice input (e.g., a voice signal) to the intelligence server 400. The client module 351 may transmit state information of the user terminal 300 to the intelligence server 400 together with the received voice input. For example, the state information may be execution state information of an app.

According to an embodiment, the client module 351 may receive a result corresponding to the received voice input. For example, when the intelligence server 400 is capable of calculating the result corresponding to the received voice input, the client module 351 may receive the result corresponding to the received voice input. The client module 351 may display the received result on the display 340.

According to an embodiment, the client module 351 may receive a plan corresponding to the received voice input. The client module 351 may display, on the display 340, a result of executing a plurality of actions of an app depending on the plan. For example, the client module 351 may sequentially display the result of executing the plurality of actions on a display. For another example, the user terminal 300 may display only a part of results (e.g., a result of the last action) of executing the plurality of actions, on the display.

According to an embodiment, the client module 351 may receive a request for obtaining information necessary to calculate the result corresponding to a voice input, from the intelligence server 400. According to an embodiment, the client module 351 may transmit the necessary information to the intelligence server 400 in response to the request.

According to an embodiment, the client module 351 may transmit, to the intelligence server 400, information about the result of executing a plurality of actions depending on the plan. The intelligence server 400 may identify that the received voice input is correctly processed, using the result information.

According to an embodiment, the client module 351 may include a speech recognition module. According to an embodiment, the client module 351 may recognize a voice input for performing a limited function, via the speech recognition module. For example, the client module 351 may launch an intelligence app for processing a specific voice input by performing an organic action, in response to a specified voice input (e.g., wake up!).

According to an embodiment, the intelligence server 400 may receive information associated with a user's voice input from the user terminal 300 over a communication network. According to an embodiment, the intelligence server 400 may convert data associated with the received voice input to text data. According to an embodiment, the intelligence server 400 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 400 may transmit a result according to the generated plan to the user terminal 300 or may transmit the generated plan to the user terminal 300. According to an embodiment, the user terminal 300 may display the result according to the plan, on a display. According to an embodiment, the user terminal 300 may display a result of executing the action according to the plan, on the display.

The intelligence server 400 according to an embodiment may include a front end 410, a natural language platform 420, a capsule database 430, an execution engine 440, an end user interface 450, a management platform 460, a big data platform 470, or an analytic platform 480.

According to an embodiment, the front end 410 may receive a voice input received from the user terminal 300. The front end 410 may transmit a response corresponding to the voice input to the user terminal 300.

According to an embodiment, the natural language platform 420 may include an automatic speech recognition (ASR) module 421, a natural language understanding (NLU) module 423, a planner module 425, a natural language generator (NLG) module 427, and/or a text to speech module (TTS) module 429.

According to an embodiment, the ASR module 421 may convert the voice input received from the user terminal 300 into text data. According to an embodiment, the NLU module 423 may grasp the intent of the user, using the text data of the voice input. For example, the NLU module 423 may grasp the intent of the user by performing syntactic analysis or semantic analysis. According to an embodiment, the NLU module 423 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 425 may generate the plan by using a parameter and the intent that is determined by the NLU module 423. According to an embodiment, the planner module 425 may determine a plurality of domains necessary to perform a task, based on the determined intent. The planner module 425 may determine a plurality of actions included in each of the plurality of domains determined based on the intent. According to an embodiment, the planner module 425 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 425 may determine the relationship between the plurality of actions and the plurality of concepts stepwise (or hierarchically). For example, the planner module 425 may determine the execution sequence of the plurality of actions, which are determined based on the user's intent, based on the plurality of concepts. In other words, the planner module 425 may determine an execution sequence of the plurality of actions, based on the parameters necessary to perform the plurality of actions and the result output by the execution of the plurality of actions. Accordingly, the planner module 425 may generate a plan including information (e.g., ontology) about the relationship between the plurality of actions and the plurality of concepts. The planner module 425 may generate the plan, using information stored in the capsule database (DB) 430 storing a set of relationships between concepts and actions.

According to an embodiment, the NLG module 427 may change specified information into information in a text form. The information changed to the text form may be in the form of a natural language speech. The TTS module 429 according to an embodiment may change information in the text form to information in a voice form.

According to an embodiment, all or part of the functions of the natural language platform 420 may be also implemented in the user terminal 300.

The capsule DB 430 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 430 may store the plurality of capsules in a form of a concept action network (CAN). According to an embodiment, the plurality of capsules may be stored in the function registry included in the capsule DB 430.

The capsule DB 430 may include a strategy registry that stores strategy information necessary to determine a plan corresponding to a voice input. When there are a plurality of plans corresponding to the voice input, the strategy information may include reference information for determining one plan. According to an embodiment, the capsule DB 430 may include a follow-up registry that stores information of the follow-up action for suggesting a follow-up action to the user in a specified context. For example, the follow-up action may include a follow-up utterance. According to an embodiment, the capsule DB 430 may include a layout registry storing layout information of information output via the user terminal 300. According to an embodiment, the capsule DB 430 may include a vocabulary registry storing vocabulary information included in capsule information. According to an embodiment, the capsule DB 430 may include a dialogue registry storing information about dialogue (or interaction) with the user. The capsule DB 430 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialogue editor that creates a dialogue with the user. The developer tool may include a follow-up editor capable of activating a follow-up target and editing the follow-up utterance for providing a hint. The follow-up target may be determined based on a target, the user's preference, or an environment condition, which is currently set. The capsule DB 430 according to an embodiment may be also implemented in the user terminal 300.

According to an embodiment, the execution engine 440 may calculate a result by using the generated plan. The end user interface 450 may transmit the calculated result to the user terminal 300. Accordingly, the user terminal 300 may receive the result and may provide the user with the received result. According to an embodiment, the management platform 460 may manage information used by the intelligence server 400. According to an embodiment, the big data platform 470 may collect data of the user. According to an embodiment, the analytic platform 480 may manage quality of service (QoS) of the intelligence server 400. For example, the analytic platform 480 may manage the component and processing speed (or efficiency) of the intelligence server 400.

According to an embodiment, the service server 500 may provide the user terminal 300 with a specified service (e.g., ordering food or booking a hotel). According to an embodiment, the service server 500 may be a server operated by the third party. According to an embodiment, the service server 500 may provide the intelligence server 400 with information for generating a plan corresponding to the received voice input. The provided information may be stored in the capsule DB 430. Furthermore, the service server 500 may provide the intelligence server 400 with result information according to the plan.

In the above-described integrated intelligence system, the user terminal 300 may provide the user with various intelligent services in response to a user input. The user input may include, for example, an input through a physical button, a touch input, or a voice input.

According to an embodiment, the user terminal 300 may provide a speech recognition service via an intelligence app (or a speech recognition app) stored therein. In this case, for example, the user terminal 300 may recognize a user utterance or a voice input, which is received via the microphone, and may provide the user with a service corresponding to the recognized voice input.

According to an embodiment, the user terminal 300 may perform a specified action, based on the received voice input, independently, or together with the intelligence server and/or the service server. For example, the user terminal 300 may launch an app corresponding to the received voice input and may perform the specified action via the executed app.

According to an embodiment, when providing a service together with the intelligence server 400 and/or the service server 500, the user terminal 300 may detect a user utterance by using the microphone 320 and may generate a signal (or voice data) corresponding to the detected user utterance. The user terminal may transmit the voice data to the intelligence server 400 by using the communication interface 310.

According to an embodiment, the intelligence server 400 may generate a plan for performing a task corresponding to the voice input or the result of performing an action depending on the plan, as a response to the voice input received from the user terminal 300. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and/or the plurality of concepts.

According to an embodiment, the user terminal 300 may receive the response by using the communication interface 310. The user terminal 300 may output the voice signal generated in the user terminal 300 to the outside by using the speaker 330 or may output an image generated in the user terminal 300 to the outside by using the display 340.

Figure 4:
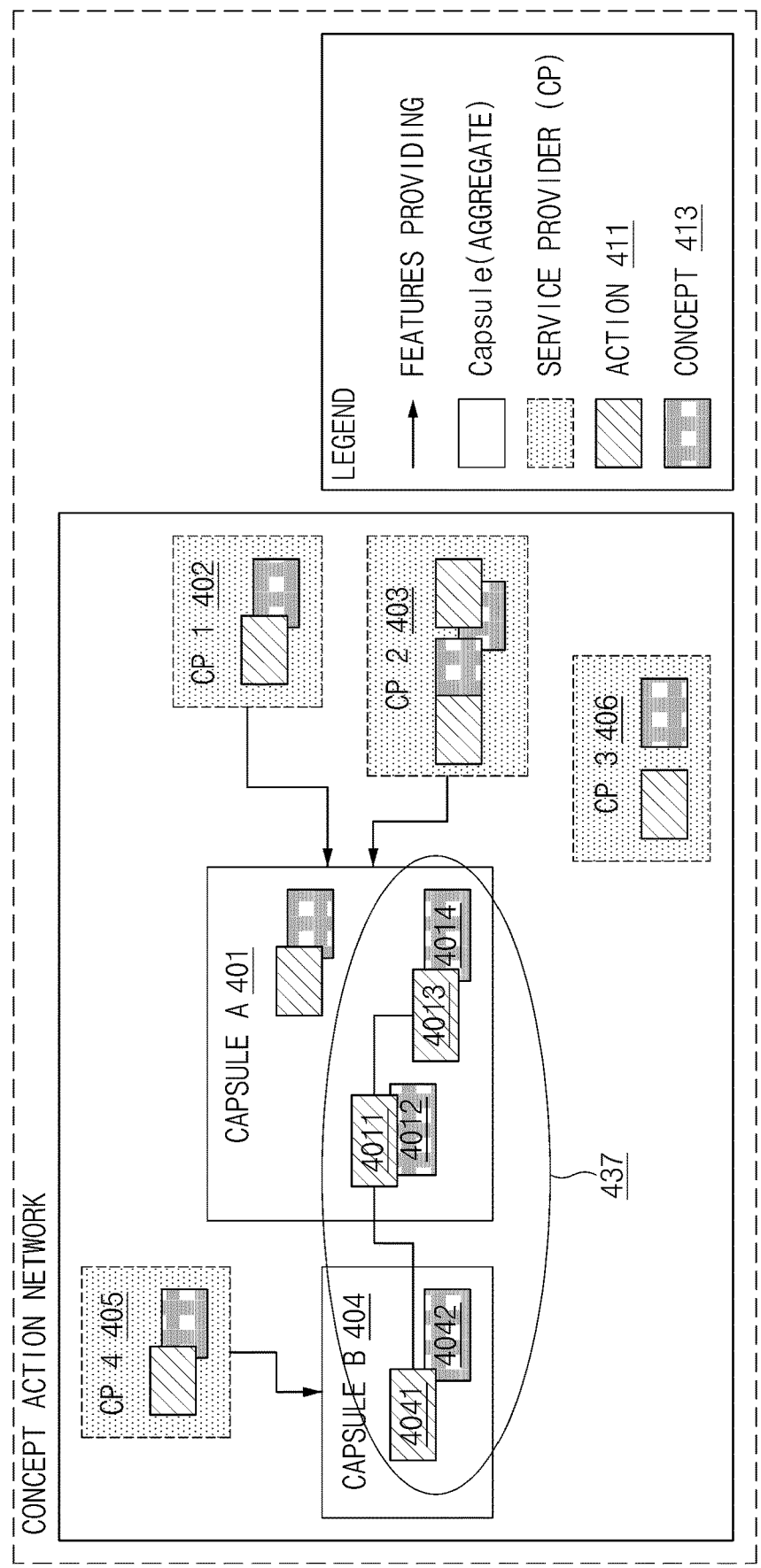
FIG. 4 is a diagram illustrating the form in which relationship information between a concept and an action is stored in a database, according to an embodiment of the disclosure.

FIG. 4 is a diagram illustrating a form in which relationship information between a concept and an action is stored in a database, according to an embodiment of the disclosure.

A capsule database (e.g., the capsule DB 430) of the intelligence server 400 may store a capsule in the form of a CAN. The capsule DB may store an action for processing a task corresponding to a user's voice input and a parameter necessary for the action, in a form of CAN.

The capsule DB may store a plurality of capsules (a capsule A 401 and a capsule B 404) respectively corresponding to a plurality of domains (e.g., applications). According to an embodiment, a single capsule (e.g., the capsule A 401) may correspond to a single domain (e.g., a location (geo) or an application). Furthermore, at least one service provider (e.g., CP 1 402, CP 2 403, CP 3 406, or CP 4 405) for performing a function for a domain associated with the capsule may correspond to one capsule. According to an embodiment, the single capsule may include at least one or more actions 411 and at least one or more concepts 413 for performing a specified function.

The natural language platform 420 may generate a plan for performing a task corresponding to the received voice input, using the capsule stored in a capsule database. For example, the planner module 425 of the natural language platform may generate the plan by using the capsule stored in the capsule database. For example, a plan 437 may be generated by using actions 4011 and 4013 and concepts 4012 and 4014 of the capsule A 401 and an action 4041 and a concept 4042 of the capsule B 404.

Figure 5:
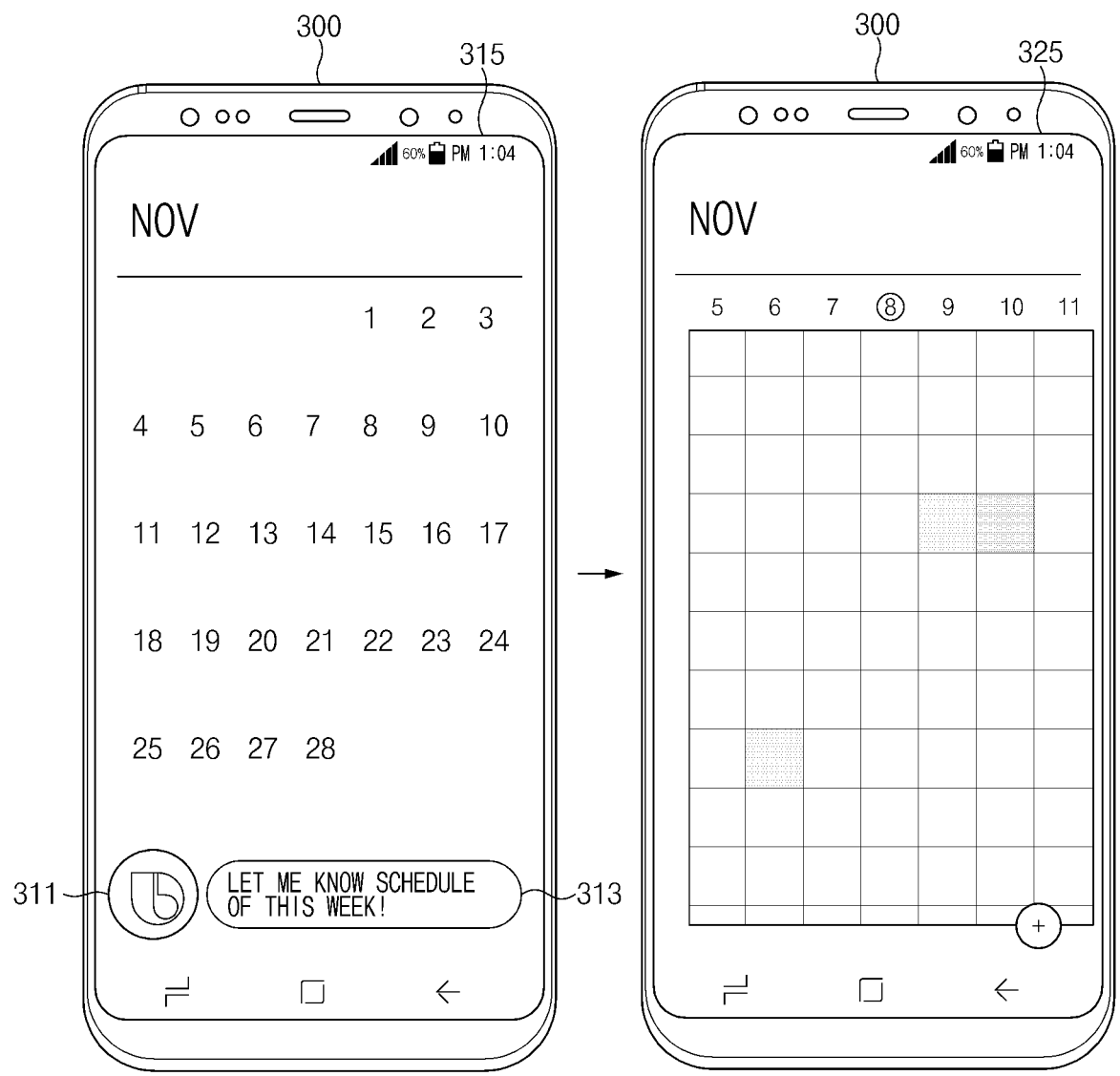
FIG. 5 is a view illustrating a user terminal displaying a screen of processing a voice input received through an intelligence app, according to an embodiment of the disclosure.

FIG. 5 is a view illustrating a screen in which a user terminal processes a voice input received through an intelligence app, according to an embodiment of the disclosure.

The user terminal 300 may execute an intelligence app to process a user input through the intelligence server 400.

According to an embodiment, on screen 315, when recognizing a specified voice input (e.g., wake up!) or receiving an input via a hardware key (e.g., a dedicated hardware key), the user terminal 300 may launch an intelligence app for processing a voice input. For example, the user terminal 300 may launch the intelligence app in a state where a schedule app is executed. According to an embodiment, the user terminal 300 may display an object (e.g., an icon) 311 corresponding to the intelligence app, on the display 340. According to an embodiment, the user terminal 300 may receive a voice input by a user utterance. For example, the user terminal 300 may receive a voice input saying that "let me know the schedule of this week!" According to an embodiment, the user terminal 300 may display a user interface (UI) 313 (e.g., an input window) of the intelligence app, in which text data of the received voice input is displayed, on a display.

According to an embodiment, on screen 325, the user terminal 300 may display a result corresponding to the received voice input, on the display. For example, the user terminal 300 may receive a plan corresponding to the received user input and may display 'the schedule of this week' on the display depending on the plan.

In an embodiment, the user terminal 301 of FIGS. 3, 4, and 5 may correspond to the electronic device 101 of FIG. 1. In an embodiment, the intelligence server 400 of FIG. 3 may correspond to one of the electronic device 104 and the server 108 of FIG. 1. In an embodiment, the processor 360 of FIG. 3 may correspond to the processor 120 of FIG. 1; the display 340 of FIG. 3 may correspond to the display device 160 of FIG. 1; the speaker 330 of FIG. 3 may correspond to the sound output module 155 of FIG. 1.

Figure 6:
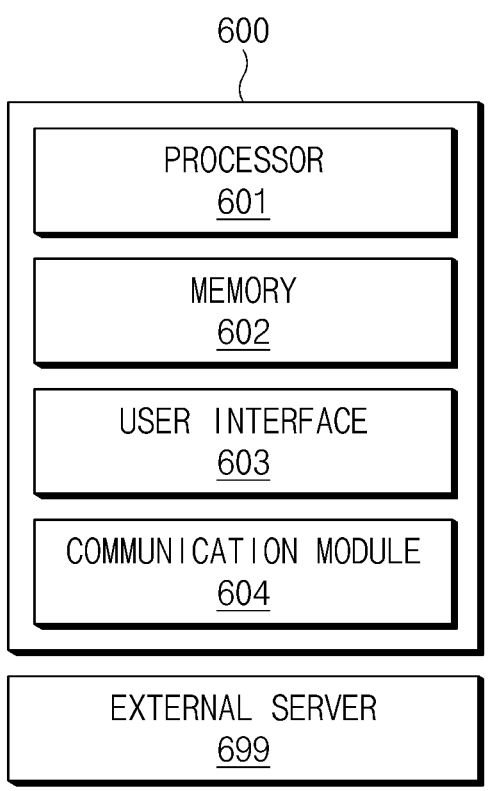
FIG. 6 is a block diagram illustrating a structure of an electronic device, according to an embodiment of the disclosure.

FIG. 6 is a block diagram illustrating a structure of an electronic device 600 according to an embodiment of the disclosure. For clarity of descriptions, contents the same as the above-described details are briefly described or omitted.

Referring to FIG. 6, the electronic device 600 may include a processor 601 (e.g., the processor 360 of FIG. 3 and/or the processor 120 of FIG. 1), a memory 602 (e.g., the memory 130 of FIG. 1), a user interface 603, and a communication module 604 (e.g., the communication module 190 of FIG. 1). The user interface 603 may include a microphone (not illustrated) (e.g., the microphone 370 of FIG. 3 and/or the input module 150 of FIG. 1) and a speaker (not illustrated) (e.g., the speaker 330 of FIG. 3 and/or the sound output module 155 of FIG. 1).

The electronic device 600 may further include at least one of additional components in addition to the components illustrated in FIG. 6. According to an embodiment, the components of the electronic device 600 may be the same entities or may constitute separate entities.

For example, the electronic device 600 may include a smartphone, a tablet PC, a wearable device, a home appliance, or a digital camera. According to an embodiment, the processor 601 may be operatively coupled to the communication module 604, the memory 602, and the user interface 603 (a microphone (not illustrated) and a speaker (not illustrated)) to perform overall functions of the electronic device 600. For example, the processor 601 may include one or more processors. For example, the one or more processors may include an image signal processor (ISP), an application processor (AP), or a communication processor (CP).

Figure 7:
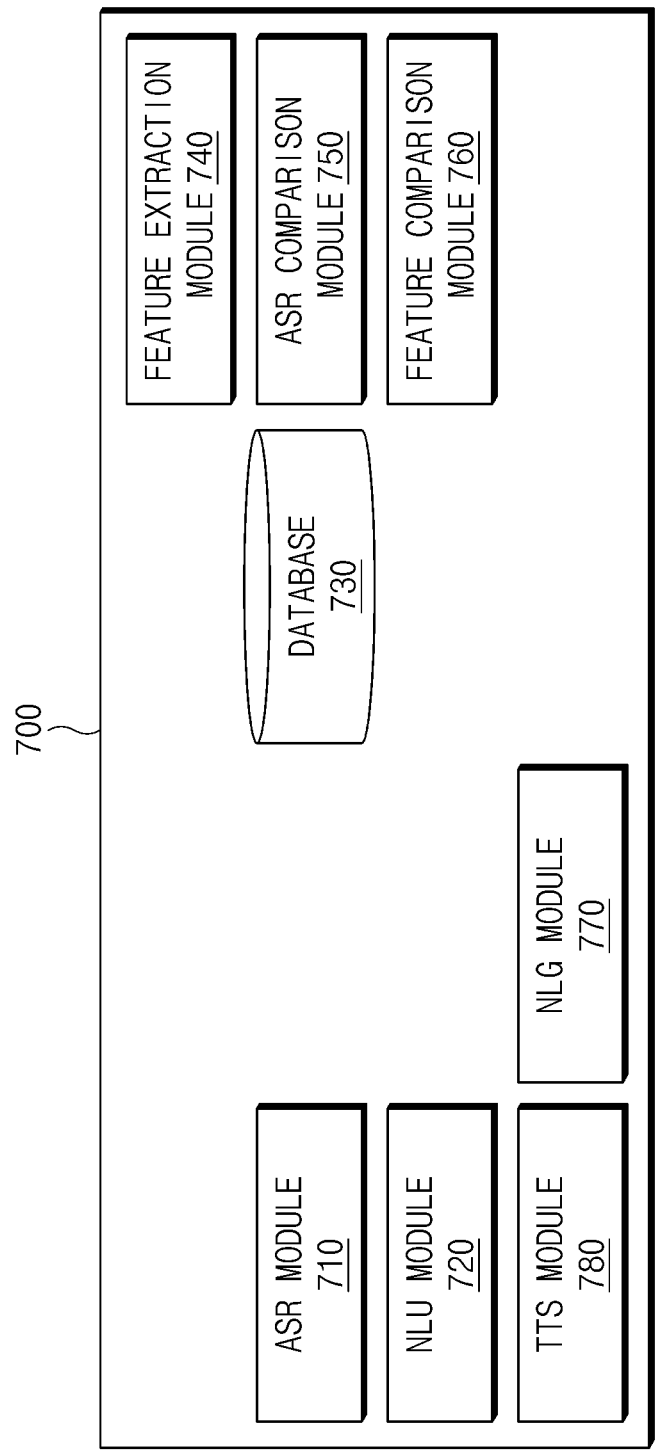
FIG. 7 is another block diagram illustrating a structure of an electronic device, according to an embodiment of the disclosure.

Furthermore, the processor 601 may drive a module (e.g., an ASR module 710, an NLU module 720, a feature extraction module 740, an ASR comparison module 750, a feature comparison module 760, an NLG module 770, and/or a TTS module 780 of FIG. 7) by executing instructions stored in the memory 602.

The processor 601 may be operatively connected to the module (e.g., the ASR module 710, the NLU module 720, the feature extraction module 740, the ASR comparison module 750, the feature comparison module 760, the NLG module 770, and/or the TTS module 780 of FIG. 7) to perform overall functions of the electronic device 600. In the embodiment disclosed in this specification, it may be understood that an operation performed (or executed) by the module (e.g., the ASR module 710, the NLU module 720, the feature extraction module 740, the ASR comparison module 750, the feature comparison module 760, the NLG module 770, and/or the TTS module 780 of FIG. 7) is an operation performed by the processor 601 executing instructions stored in the memory 602.

In an embodiment, the processor 601 may include the module (e.g., the ASR module 710, the NLU module 720, the feature extraction module 740, the ASR comparison module 750, the feature comparison module 760, the NLG module 770, and/or the TTS module 780 of FIG. 7). In this case, an operation performed (or executed) by each module (e.g., the ASR module 710, the NLU module 720, the feature extraction module 740, the ASR comparison module 750, the feature comparison module 760, the NLG module 770, and/or the TTS module 780 of FIG. 7) may be implemented as at least part of the processor 601.

Several modules described in various embodiments of the disclosure may be implemented by hardware or software.

The memory 602 may store a database (not illustrated) (e.g., a database 730 of FIG. 7) including at least one input data. The memory 602 may store commands, information, or data associated with operations of components included in the electronic device 600. For example, the memory 602 may store instructions, when executed, that cause the processor 601 to perform various operations according to various embodiments described in this specification.

In an embodiment, the electronic device 600 may receive a user input by using the user interface 603. The user input may be an input including a user voice signal (e.g., a user's utterance input).

In an embodiment, the user input may be a user's voice input (e.g., an utterance). When the user input is a voice input, the electronic device 600 may receive a user input through a microphone (or a voice receiving device) (e.g., the input module 150 of FIG. 1).

In an embodiment, the user input may be a touch input for uploading a file including the user's voice. When the user input is a touch input, the electronic device 600 may receive a user input through a touch sensor (the display module 160).

According to an embodiment, the processor 601 may include a sound module (not illustrated). The sound module may recognize a user input for executing an operation. For example, the sound module may recognize and receive a voice signal included in the voice input. For example, the sound module recognizing the user input may have a high speech recognition rate because ambient noise is strong.

According to an embodiment, the sound module may be learned to recognize and receive the user input by using an algorithm for recognizing a voice. For example, the algorithm for recognizing the voice may be at least one of a hidden Markov model (HMM) algorithm, an artificial neural network (ANN) algorithm, and a dynamic time warping (DTW) algorithm.

In an embodiment, at least one operation among operations of each component described with reference to the electronic device 600 may be performed (or executed) by an external server 699 or another electronic device (not illustrated). For example, the processor 601 may transmit a user input to the external server 699 or the other electronic device (not illustrated) by using the communication module 604.

A processor (not illustrated) included in the external server 699 or the other electronic device (not illustrated) may receive the user input, may generate response data, and may transmit the response data to the electronic device 600.

The processor 601 may receive the response data corresponding to the user input from the external server 699 or the other electronic device (not illustrated) through the communication module 604. When receiving the response data, the processor 601 may allow a speaker (not illustrated) to output the response data. Alternatively, the processor 601 may control another device through the communication module 604 or may transmit and/or receive data through the communication module 604. The processor 601 may be composed of at least one processor, and may be driven while being physically divided into a main processor performing high-performance processing and an auxiliary processor performing low-power processing. Alternatively, one processor may process data while switching between high performance and low power depending on situations.

Hereinafter, an operation of the processor 601 will be described in detail.

In an embodiment, the instructions may cause the processor 601 to receive a voice input of a user, to extract a feature from the voice input of the user, to select an acoustic model through comparison with the extracted feature, and to learn the feature of the voice input by performing fine-tuning on the selected acoustic model.

In an embodiment, the electronic device 600 may further include a voice receiving device operatively connected to the processor 601. The instructions may cause the processor 601 to receive the voice input of the user through the voice receiving device, to determine whether a similarity corresponding to the voice input is greater than a threshold value, and to extract the feature from the voice input in response to the voice input being greater than the threshold value.

In an embodiment, the electronic device 600 may further include at least one output device of a speaker or a display operatively connected to the processor 601. The instructions may cause the processor 601 to output a message for requesting a voice input again through the at least one output device according to the similarity corresponding to the voice input being less than the threshold value.

In an embodiment, the electronic device 600 may further include a text-to-speech (TTS) module operatively connected to the processor 601. The instructions may cause the processor 601 to load the selected acoustic model onto a decoder of the TTS module and to perform fine-tuning on the decoder so that the selected acoustic model learns the feature of the voice input.

In an embodiment, the electronic device 600 may further include a database operatively connected to the processor 601. The instructions may cause the processor 601 to compare the extracted feature with at least one acoustic model included in the database and to select the acoustic model having the highest similarity with the extracted feature.

In an embodiment, the electronic device 600 may further include a database operatively connected to the processor 601. The instructions may cause the processor 601 to extract a latent vector from the voice input of the user and to determine the similarity by comparing the latent vector with latent vectors of at least one or more acoustic models included in the database.

In an embodiment, the electronic device 600 may further include a sound model operatively connected to the processor 601. The instructions may cause the processor 601 to receive a voice signal included in the voice input by using the sound model. The sound model may be learned by using a learning algorithm.

In an embodiment, the instructions may cause the processor 601 to identify a frequency of usage of the electronic device for each time zone, and to perform the fine-tuning at a time zone at which the frequency of usage is lowest.

In an embodiment, the instructions may cause the processor 601 to determine an accuracy of the fine-tuning and to complete the learning in response to the determined accuracy being lower than a threshold.

In an embodiment, the electronic device 600 may further include an output device operatively connected to the processor 601. The instructions may cause the processor 601 to provide a response through the output device by using the learned acoustic model.

FIG. 7 is another block diagram illustrating a structure of an electronic device, according to an embodiment of the disclosure. For clarity of descriptions, contents the same as the above-described details are briefly described or omitted.

Referring to FIG. 7, an electronic device 700 may include the ASR module 710 (e.g., the ASR module 421 of FIG. 3), the NLU module 720 (e.g., the NLU module 423 of FIG. 3), the feature extraction module 740, the ASR comparison module 750, the feature comparison module 760, the NLG module 770, and/or the TTS module 780 (e.g., the TTS module 429 of FIG. 3). The listed components may be operatively or electrically connected to one another.

The ASR module 710 may convert the received user input into text data. For example, the ASR module 710 may convert the received voice data to text data.

The NLU module 720 may grasp the user's intent by performing syntactic analysis or semantic analysis. According to an embodiment, the NLU module 720 may grasp the meaning of words extracted from the voice input by using linguistic features (e.g., syntactic elements) such as morphemes or phrases and may determine the intent of the user by matching the grasped meaning of the words to the intent.

The feature extraction module 740 may extract a feature from voice data. The feature extraction module 740 may be implemented with deep learning-based technology. In an embodiment, the feature extraction module 740 may extract a latent vector. The latent vector may refer to a vector indicating a phonetic feature of a user.

The ASR comparison module 750 may determine whether the text data converted by the ASR module 710 is data at a level usable as learning data. In an embodiment, the ASR comparison module 750 may determine whether the converted text data is usable as a learning model, by comparing the text, which induces the user to speak (hereinafter referred to as an "utterance-induced text"), with the text converted by the ASR module 710. In an embodiment, the ASR comparison module 750 may determine whether the text converted by the ASR module 710 exceeds a threshold value. The threshold value may refer to a reference value for determining the similarity between the utterance-induced text and the text obtained by converting the user input. The accuracy of the user input may be increased by determining the threshold value. When the converted text exceeds the threshold value, the ASR comparison module 750 may use the converted text in a synthesis model. On the other hand, when the converted text does not exceed the threshold value, a notification for requesting the user to read a new sentence may be generated.

The feature comparison module 760 may determine the similarity by comparing the latent vector of the models stored in a database 730 with the extracted latent vector, and then may select a model capable of becoming the most similar baseline as a new acoustic model.

The NLG module 770 may change the specified information into information in a text form. The information changed in the text form may have a form of natural language utterance.

The TTS module 780 may load the selected model and may use the selected model as a new acoustic model. In an embodiment, the TTS module 780 may learn the user's utterance. The TTS module 780 may learn the user's utterance by finely tuning the loaded new acoustic model. In an embodiment, the TTS module 780 may adjust time to learn depending on the frequency of usage of the user. In an embodiment, the TTS module 780 may perform the learning by using a situation where the user employs the electronic device 101 less frequently. For example, the TTS module 780 may perform the learning when the user sleeps while charging the electronic device 101 with power connected.

In an embodiment, the TTS module 780 may determine the accuracy of the learning. In an embodiment, when a numerical value indicating the learning accuracy is lower than the threshold value while the TTS module 780 performs the fine-tuning learning, the TTS module 780 may complete the learning. For example, when a loss value is lower than the threshold value, the TTS module 780 may complete the learning.

In various embodiments of the disclosure, the TTS module 780 may use an acoustic model loaded from the database 730 as a new acoustic model of a decoder. The TTS module 780 may learn the user's utterance by finely tuning only the new acoustic model, and thus providing personalized voice service with only a small amount of voice data of the user.

The TTS module 780 may convert response data in a text form into voice data. The electronic device 700 (and/or a processor (e.g., the processor 601 in FIG. 6)) may output the response data converted into the voice data, through a speaker (e.g., the sound output module 155 of FIG. 1).

Figure 8:
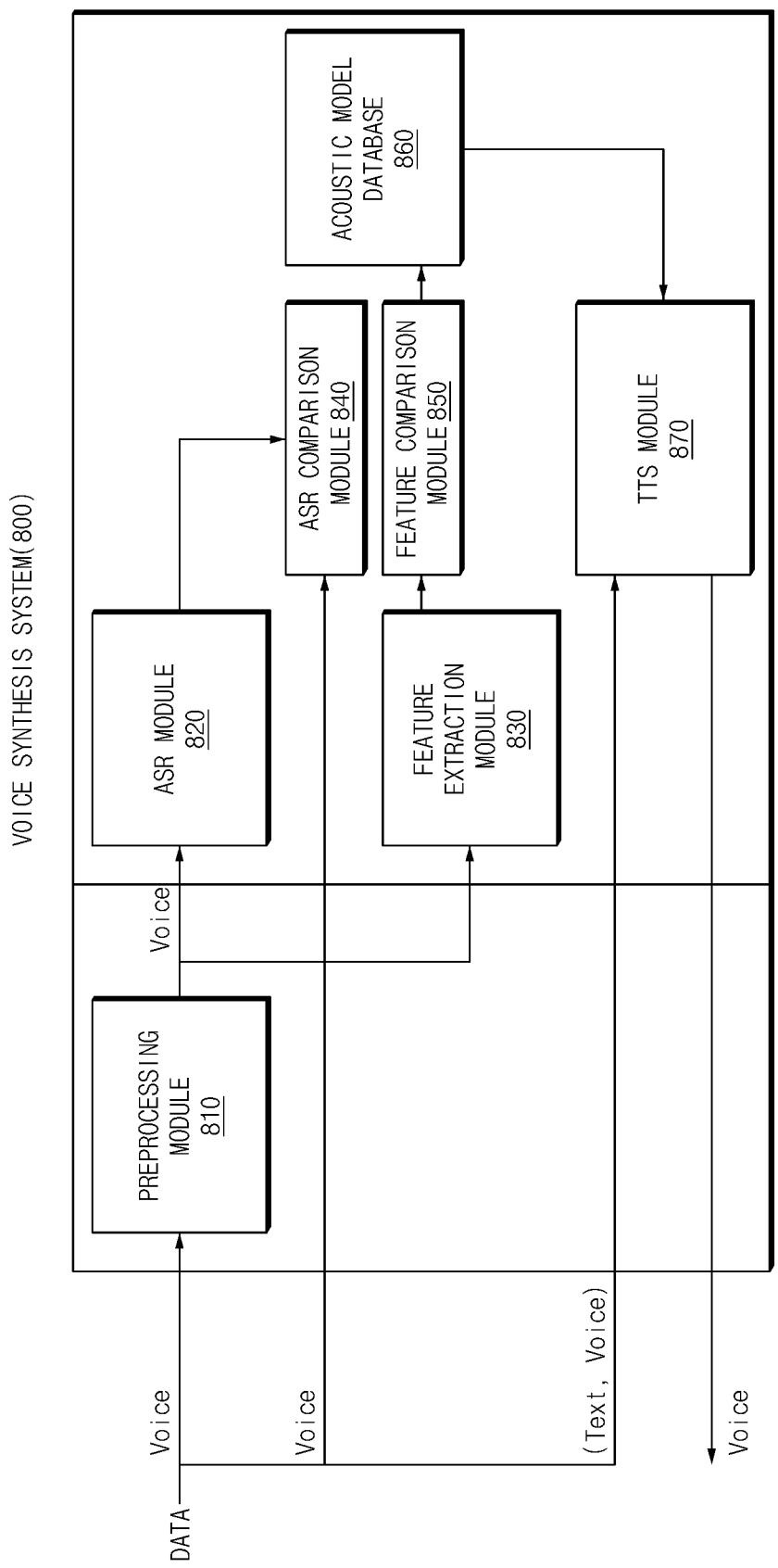
FIG. 8 is a block diagram illustrating a structure of a voice synthesis system, according to an embodiment of the disclosure.

FIG. 8 is a block diagram illustrating a structure of a voice synthesis system, according to an embodiment of the disclosure. For clarity of descriptions, contents the same as the above-described details are briefly described or omitted.

Referring to FIG. 8, a voice synthesis system 800 may provide a personalized voice service. According to an embodiment that is illustrated, the voice synthesis system 800 may include a preprocessing module 810, an ASR module 820, a feature extraction module 830, an ASR comparison module 840, a feature comparison module 850, an acoustic model database 860, and/or a TTS module 870. The listed components may be operatively or electrically connected to one another.

According to an embodiment, the voice synthesis system 800 may be generated based on an artificial intelligence (AI) technology. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system.

The preprocessing module 810 according to an embodiment may increase the quality of data by processing data. For example, the preprocessing module 810 may perform tasks of data refinement, data integration, data reduction, and/or data conversion. The data refinement may include an operation of filling in incomplete data and correcting inconsistent data. The data integration may include an operation of merging various divided databases and files for easy analysis. The data reduction may include an operation of sampling only some of input data or reducing the dimension of data to be analyzed. The data conversion may include an operation of normalizing or grouping data by obtaining an average value of the data. The preprocessing module 810 may process data, thereby preventing meaningless values from being included in data or preventing data quality from being degraded due to unintended variables. Accuracy and timeliness may be increased through the preprocessing module 810.

The ASR module 820 according to an embodiment may convert the received voice data into text data.

The ASR comparison module 840 may determine whether the text data converted by the ASR module 820 is data at a level usable as learning data in the voice synthesis system 800. In an embodiment, the ASR comparison module 840 may determine whether the converted text data is usable as a learning model of the voice synthesis system 800, by comparing an utterance-induced text with the text converted by the ASR module 820. In an embodiment, the ASR comparison module 840 may determine whether the text converted by the ASR module 820 exceeds a threshold value. When the converted text exceeds the threshold value, the ASR comparison module 840 may use the converted text in a synthesis model of the voice synthesis system 800. On the other hand, when the converted text does not exceed the threshold value, a notification for requesting the user to read a new sentence may be generated.

According to an embodiment, the feature extraction module 830 may extract a feature from the preprocessed voice data. The feature extraction module 830 may be implemented with deep learning-based technology. In an embodiment, the feature extraction module 830 may extract a latent vector. The latent vector may refer to a vector indicating a phonetic feature of a user.

According to an embodiment, the feature comparison module 850 may select a model capable of becoming the most similar baseline as a new acoustic model by comparing the latent vector of the models stored in the acoustic model database 860 with the extracted latent vector.

According to an embodiment, the TTS module 870 may load the selected model and may use the selected model as a new acoustic model. In an embodiment, the TTS module 870 may learn the user's utterance. The TTS module 870 may learn the user's utterance by finely tuning the loaded new acoustic model. In an embodiment, the TTS module 870 may adjust time to learn depending on the frequency of usage of the user. In an embodiment, the TTS module 870 may perform the learning by using a situation where the user employs the electronic device 101 less frequently. For example, the TTS module 870 may perform the learning when the user sleeps while charging the electronic device 101 with power connected.

In an embodiment, the TTS module 870 may determine the accuracy of the learning. In an embodiment, when a numerical value indicating the learning accuracy is lower than the threshold value while the TTS module 870 performs the fine-tuning learning, the TTS module 780 may complete the learning. For example, when a loss value is lower than the threshold value, the TTS module 870 may complete the learning.

In various embodiments of the disclosure, the TTS module 870 may use an acoustic model loaded from the acoustic model database 860 as a new acoustic model of a decoder. The TTS module 870 may learn the user's utterance by finely tuning only the new acoustic model, and thus providing personalized voice service with only a small amount of voice data of the user.

Hereinafter, the learning of the TTS module 870 will be described in more detail with reference to FIG. 9.

Figure 9:
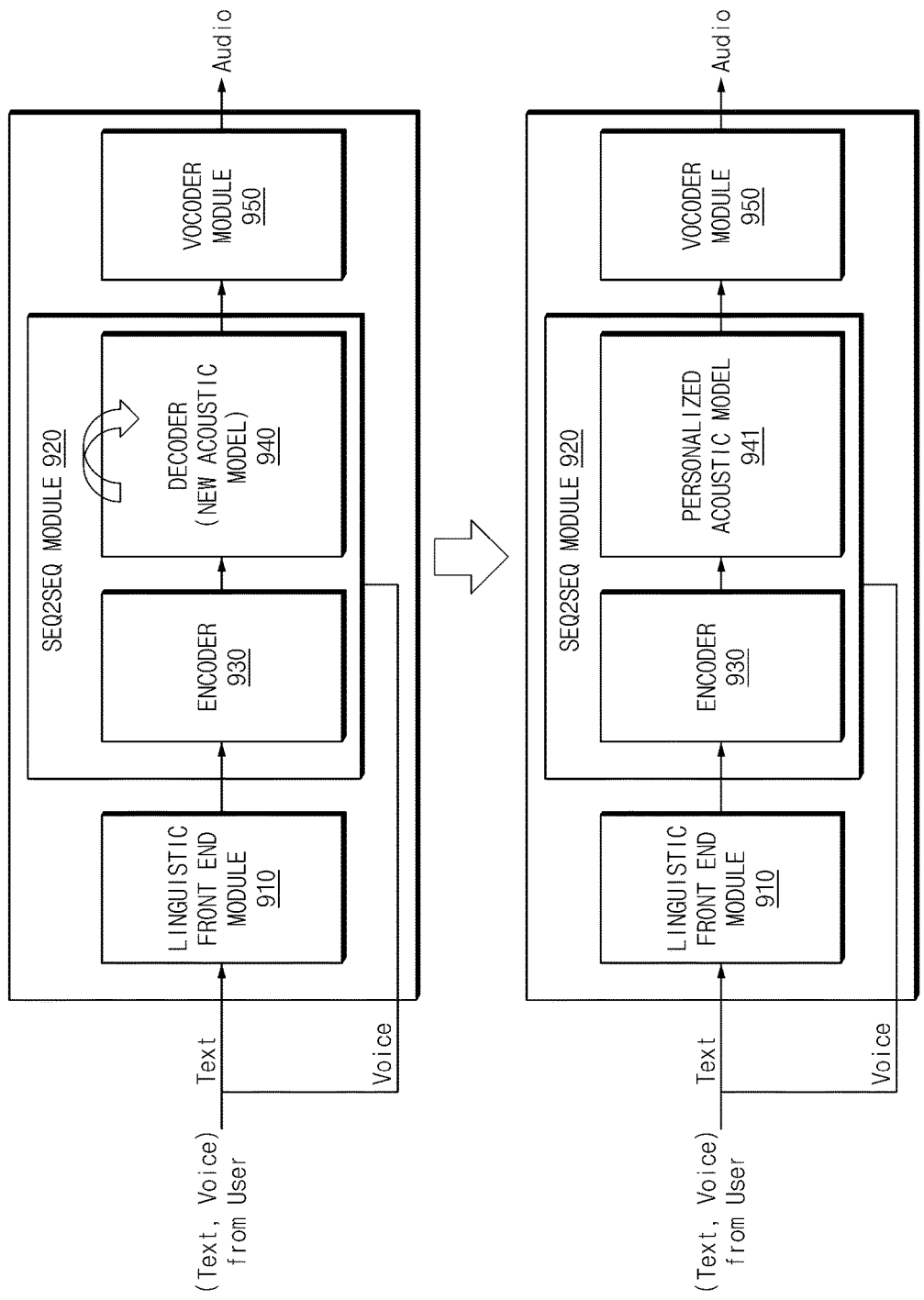
FIG. 9 is a block diagram illustrating a structure of a TTS system, according to an embodiment of the disclosure.

FIG. 9 is a block diagram illustrating a structure of a TTS system according to an embodiment of the disclosure.

Referring to FIG. 9, a TTS system 900 may include a linguistic front end module 910, a sequence to sequence module (seq2seq module) 920, and/or a vocoder module 950. The seq2seq module 920 may include an encoder module 930 and/or a decoder module 940. The listed components may be operatively or electrically connected to one another.

In an embodiment, the linguistic front end module 910 may receive, as an input, a text of a voice input received from a user terminal (e.g., the electronic device 101 of FIG. 1). The linguistic front end module 910 may convert the text input into a phonetic feature. For example, the linguistic front end module 910 may convert the received input into a phonetic feature such as a phoneme sequence. The phoneme may mean a minimum unit in a voice having a function of identifying meanings from words. In an embodiment, the linguistic front end module 910 may put the converted phonetic feature to an input of the seq2seq module. The linguistic front end module 910 may put the converted phonetic feature to an input of the seq2seq module. Accordingly, learning performance may have higher efficiency as compared to directly putting characters of a text to the input of seq2seq module.

In an embodiment, the seq2seq module 920 may mean a recurrent neural network (RNN)-type module, which deals with time-series data, in a broad sense. In an embodiment, the seq2seq module may refer to a transformer-type module composed only of an attention module.

In an embodiment, the seq2seq module 920 may utilize both features of a convolutional neural network (CNN) that is useful for capturing partial features and a recurrent neural network (RNN) that is useful for generating sequential data. For example, the seq2seq module 920 sequentially may learn utterance data having a length of several seconds as much as a predetermined size and may generate results by referring to the extracted partial features as a whole by using RNN while extracting voice features by using CNN at the same time.

In an embodiment, the seq2seq module 920 may include the encoder module 930 and the decoder module 940.

In an embodiment, the encoder module 930 may include a prosody model. The encoder module 930 may learn features of voice prosody by using the prosody model.

In an embodiment, the decoder module 940 may generate a target speaker's voice based on the identified features of the prosody. In an embodiment, the decoder module 940 may include a new acoustic model. In an embodiment, the new acoustic model may mean a model that is selected as a model capable of becoming the most similar baseline by comparing the latent vector of the models stored in an acoustic model database (not illustrated) (the acoustic model database 860 of FIG. 8) with the latent vector extracted from the target speaker's voice.

In an embodiment, the decoder module 940 may learn a user's utterance by finely tuning the loaded new acoustic model. The decoder module 940 may make a personalized acoustic model 941 by finely tuning the loaded new acoustic model. In an embodiment, the decoder module 940 may adjust time to learn depending on the frequency of usage of the user. In an embodiment, the decoder module 940 may perform the learning by using a situation where the user employs the electronic device 101 less frequently. For example, the decoder module 940 may perform the learning when the user sleeps while charging the electronic device 101 with power connected.

The decoder module 940 may learn the user's utterance by finely tuning only the new acoustic model, and thus providing personalized voice service with only a small amount of voice data of the user.

In an embodiment, the vocoder module 950 may receive data from the seq2seq module 920 as input data and may restore the input data as a wave file. For example, the vocoder module 950 may receive mel-spectrum data from the seq2seq module 920 as input data and may restore the input data as a wave file. The vocoder module 950 may include a deep learning-based universal neural vocoder model. The universal neural vocoder may cover the spectrum of voice features of various people by performing learning based on a database of various speakers.

Hereinafter, a method performed by the electronic device 101 according to an embodiment disclosed in the specification will be described with reference to FIGS. 10 and 11.

Figure 10:
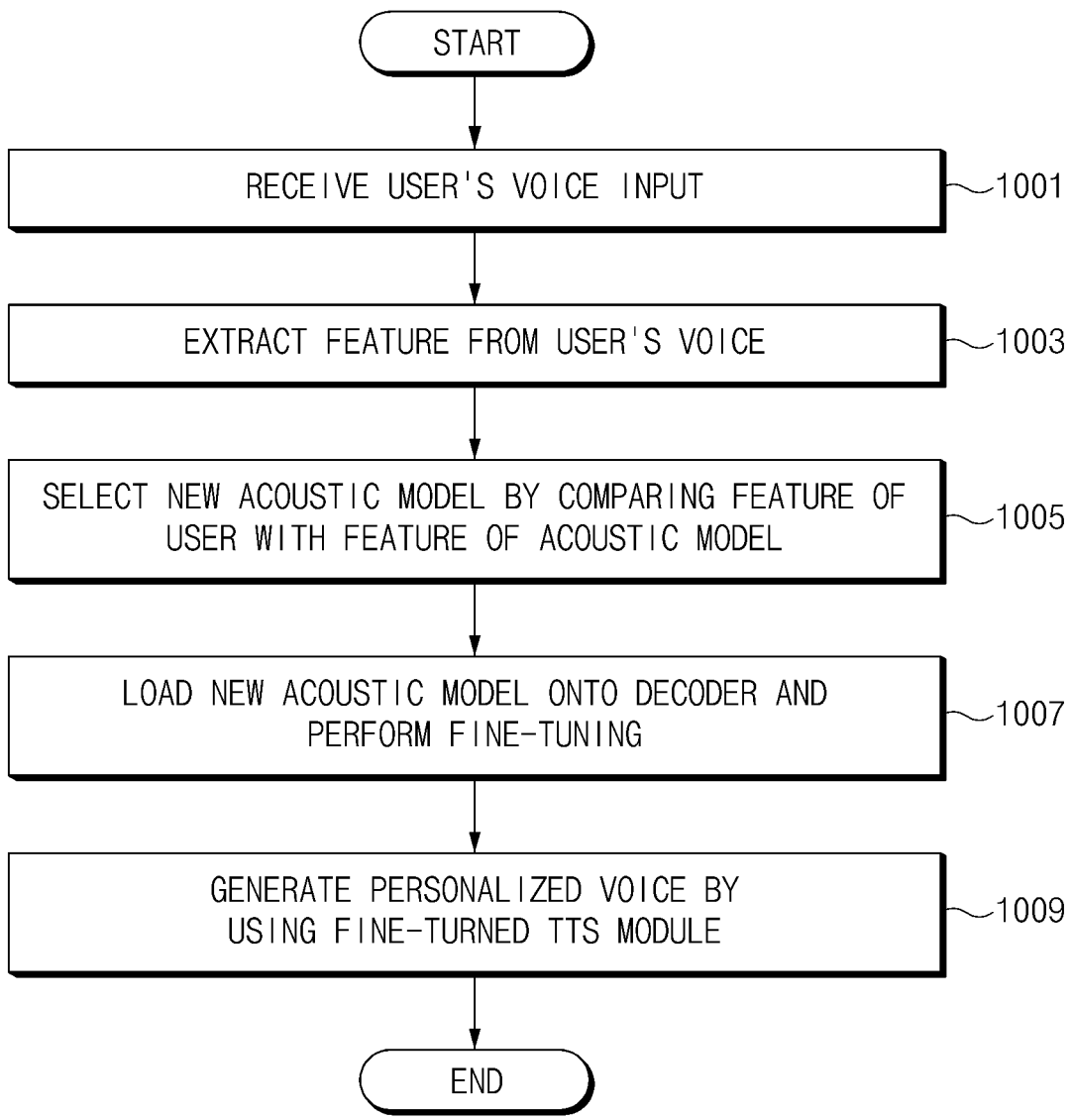
FIG. 10 is a flowchart of a method performed by an electronic device, according to an embodiment of the disclosure.

FIG. 10 is a flowchart of a method performed by an electronic device, according to an embodiment of the disclosure.

According to an embodiment, it may be understood that the process 1000 illustrated in FIG. 10 is performed by the processor (e.g., the processor 120 of FIG. 1) of an electronic device (e.g., the electronic device 101 of FIG. 1) by executing instructions stored in a memory (e.g., the memory 130 of FIG. 1).

In operation 1001, the electronic device 101 may receive a user's voice input. In an embodiment, the electronic device 101 may receive a user input by using a user interface. The user interface may include a microphone, touch screen and/or input device. In an embodiment, the electronic device 101 may receive a user input through a microphone (or a voice receiving device). The electronic device 101 may identify input data matched with the received user input. For example, when the user input is a voice input (e.g., an utterance), the electronic device 101 may convert the received user input into text data.

In an embodiment, the electronic device 101 may process data of the received voice input of the user. For example, the electronic device 101 may perform data refinement, data integration, data reduction, and/or data conversion on the received voice input data of the user. The electronic device 101 may improve the quality of data by processing the data.

In operation 1003, the electronic device 101 may extract features from the user's voice. In an embodiment, the electronic device 101 may extract features from the processed voice data. In an embodiment, the electronic device 101 may extract features from the processed voice data by using a feature extraction module implemented with a deep learning-based technology. In an embodiment, the electronic device 101 may extract a latent vector. The latent vector may refer to a vector indicating a phonetic feature of a user.

In operation 1005, the electronic device 101 may select a new acoustic model by comparing the extracted feature of the user with the feature of the acoustic model. The acoustic model may mean a model stored in an acoustic model database. In an embodiment, the electronic device 101 may select a new acoustic model by using a feature comparison module. For example, the feature comparison module may select a model capable of becoming the most similar baseline as the new acoustic model by comparing the latent vector of the models stored in the acoustic model database with the extracted latent vector.

In operation 1007, the electronic device 101 may load the selected new acoustic model onto a decoder and may perform fine-tuning. In an embodiment, the electronic device 101 may load the selected new acoustic model onto the decoder by using a TTS module and may perform fine-tuning. In an embodiment, the TTS module may adjust time to learn depending on the frequency of usage of the user. For example, the TTS module may perform the learning by using a situation where the user employs the electronic device 101 less frequently. For example, the TTS module may perform the learning when the user sleeps while charging the electronic device 101 with power connected.

In an embodiment, the TTS module may determine the accuracy of the learning. In an embodiment, when a numerical value indicating the learning accuracy is lower than the threshold value while the TTS module performs the fine-tuning learning, the TTS module may complete the learning. For example, when a loss value is lower than the threshold value, the TTS module may complete the learning.

The TTS module may learn the user's utterance by finely tuning only the new acoustic model, and thus providing personalized voice service with only a small amount of voice data of the user.

In operation 1009, the electronic device 101 may generate a personalized voice by using the fine-turned TTS module. In an embodiment, the electronic device 101 may generate the personalized voice by using a vocoder module included in the TTS module. The vocoder module may receive data from a seq2seq module as input data and may restore the input data as a wave file. In an embodiment, the vocoder module may include a deep learning-based universal neural vocoder model. The universal neural vocoder may cover the spectrum of voice features of various people by performing learning based on a database of various speakers. For example, the universal neural vocoder may receive mel-spectrum data from the seq2seq module 920 as input data and may restore the input data as a wave file.

In an embodiment, the TTS module may output response data by using the restored wave file through an output device (e.g., a speaker). In an embodiment, the electronic device 101 may output the wave file as response data of a voice assistant or a TTS-dedicated application.

Referring to FIG. 10, the electronic device 101 sequentially performs operations 1001 to 1009. However, this is only an example. For example, a part of the operation may be performed by the electronic device 101 and the other parts may be performed by an external device. For example, operation 1001 may be performed by the electronic device and operation 1003 to operation 1009 may be performed by a server.

Figure 11:
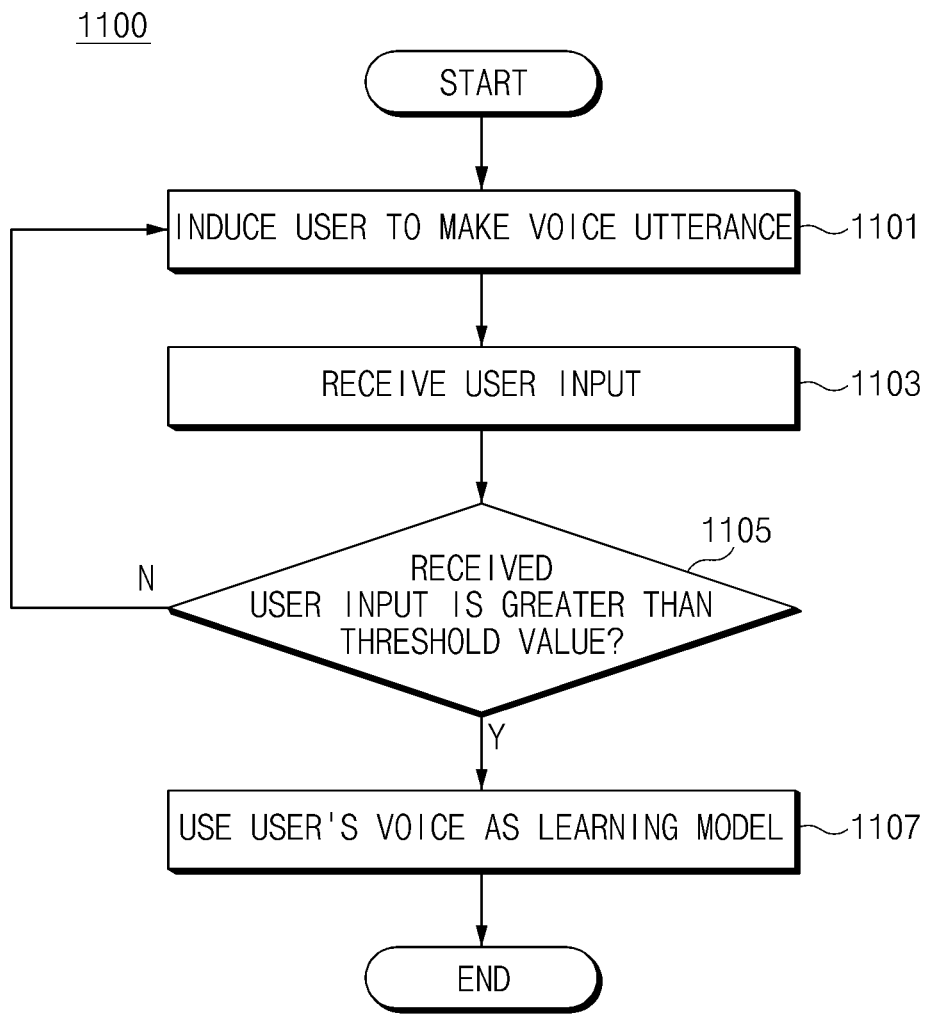
FIG. 11 is a flowchart of a method for identifying accuracy when an electronic device extracts a user utterance, according to an embodiment of the disclosure.

FIG. 11 is a flowchart of a method for identifying accuracy when the electronic device extracts a user's utterance according to an embodiment of the disclosure.

Referring to FIG. 11, it may be understood that a process 1100 is performed by the processor (e.g., the processor 120 of FIG. 1) of an electronic device (e.g., the electronic device 101 of FIG. 1) by executing instructions stored in a memory (e.g., the memory 130 of FIG. 1).

In operation 1101, the electronic device 101 may induce a user to make a voice utterance. For example, the electronic device 101 may induce the user to read the small number of specified sentences. In an embodiment, the electronic device 101 may use an output device to induce the user's voice utterance. For example, the electronic device 101 may display a message for inducing a voice utterance to the user by using the display. Alternatively, the electronic device 101 may output a message inducing voice utterance to the user using a speaker.

In operation 1103, the electronic device 101 may receive a user input. In an embodiment, the user input may mean an utterance input. For example, the electronic device 101 may receive the user's utterance input by using a user interface. The user interface may include a microphone, touch screen and/or input device. In an embodiment, the electronic device 101 may receive a user input through a microphone (or a voice receiving device). The electronic device 101 may identify input data matched with the received user input. For example, when the user input is a voice input (e.g., an utterance), the electronic device 101 may convert the received user input into text data.

In an embodiment, the electronic device 101 may process data of the received user's voice input. For example, the electronic device 101 may perform data refinement, data integration, data reduction, and/or data conversion on the received voice input data of the user. The electronic device 101 may improve the quality of data by processing the data.

In operation 1105, the electronic device 101 may determine whether the user input is greater than a threshold value. The electronic device 101 may determine whether the user input is greater than a threshold value, by comparing the text, which obtained by converting a user input, with the utterance-induced text. The threshold value may refer to a reference value for determining the similarity between the utterance-induced text and the text obtained by converting the user input. The accuracy of the user input may be increased by determining the threshold value. The threshold value may be set or may be determined depending on the performance of the electronic device 101. When the electronic device 101 determines that the user input is greater than the threshold value, the electronic device 101 may perform operation 1101. On the other hand, when the electronic device 101 determines that the user input is greater than the threshold value, the electronic device 101 may perform operation 1107. In operation 1107, the electronic device 101 may use the user's voice as a learning model.

Referring to FIG. 11, when the user does not properly read the given text, the electronic device 101 may increase the accuracy of voice to be used as a learning model, by inducing a new utterance and receiving a new user input. The electronic device 101 may learn the user's utterance with only the voice for the small number of sentences, by increasing the accuracy of the voice to be used as the learning model.

Referring to FIG. 11, the electronic device 101 sequentially performs operations 1101 to 1107. However, this is only an example. For example, a part of the operation may be performed by the electronic device 101 and the other parts may be performed by an external device. For example, operations 1101 and 1103 may be performed by the electronic device and operations 1105 and 1107 may be performed by a server.

Hereinafter, a method performed by the electronic device 101 will be described in detail. In an embodiment, a method performed by the electronic device 101 may include receiving a voice input of a user, extracting a feature from the voice input of the user, selecting an acoustic model through comparison with the extracted feature, and performing fine-tuning on the selected acoustic model so that the selected acoustic model learns the feature of the voice input.

In an embodiment, the method performed by the electronic device 101 may further include receiving the voice input of the user through a voice receiving device included in the electronic device or operatively connected to the electronic device, determining whether a similarity corresponding to the voice input is greater than a threshold value and extracting the feature from the voice input in response to the voice input being greater than the threshold value.

In an embodiment, the method performed by the electronic device 101 may further include outputting a message for requesting a voice input again through at least one output device of a speaker or a display included in the electronic device or operatively connected to the electronic device in response to the similarity corresponding to the voice input being less than the threshold value.

In an embodiment, the method performed by the electronic device 101 may further include loading the selected acoustic model onto a decoder of a text-to-speech (TTS) module operatively connected to the processor and performing fine-tuning on the decoder so that the selected acoustic model learns the feature of the voice input.

In an embodiment, the method performed by the electronic device 101 may further include comparing the extracted feature with at least one acoustic model included in a database and selecting the acoustic model in the database having the highest similarity with the extracted feature.

In an embodiment, the method performed by the electronic device 101 may further include extracting a latent vector from the voice input of the user and determining the similarity by comparing the latent vector with a latent vector of at least one acoustic model included in the database.

In an embodiment, the method performed by the electronic device 101 may further include receiving a voice signal included in the voice input by using a sound model. The sound model may be learned by using a learning algorithm.

In an embodiment, the method performed by the electronic device 101 may further include identifying a frequency of usage of the electronic device for each time zone and performing the fine-tuning at a time zone at which the frequency of usage is lowest.

In an embodiment, the method performed by the electronic device 101 may further include determining an accuracy of the fine-tuning and completing the learning in response to the determined accuracy being lower than a threshold.

In an embodiment, the method performed by the electronic device 101 may further include providing a response by using the learned acoustic model through an output device operatively connected to the processor.

Hereinafter, a method, in which the electronic device 101 according to an embodiment processes a user input by inducing a user's utterance, will be described in detail with reference to the diagrams illustrated in FIGS. 12 to 13.

Figure 12:
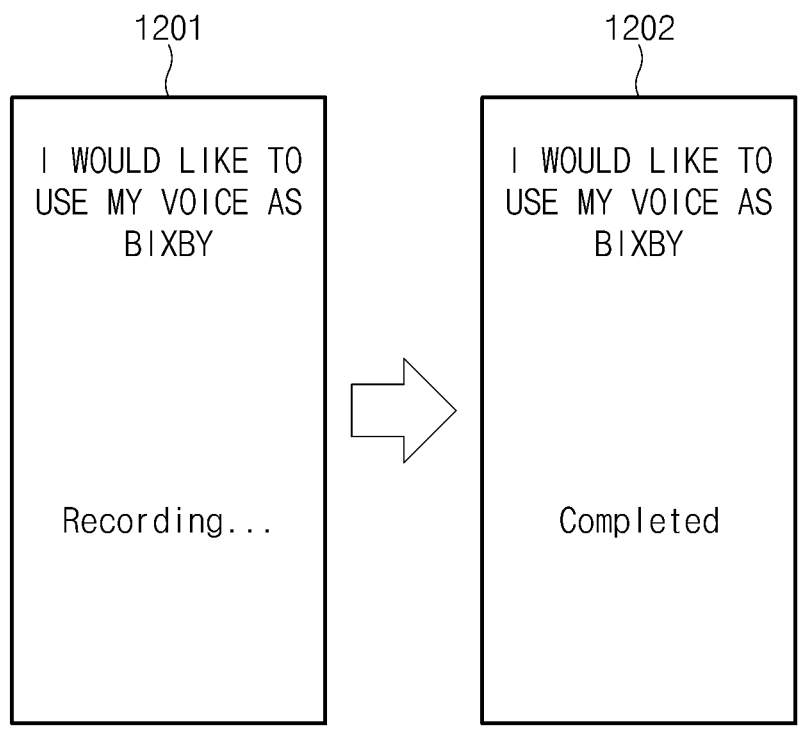
FIG. 12 is a diagram of a method, in which an electronic device processes a user input, in detail, a user's voice input by inducing the user's utterance, according to an embodiment of the disclosure.

FIG. 12 is a diagram of a method, in which the electronic device processes a user input, in detail, a user's voice input by inducing the user's utterance, according to an embodiment of the disclosure.

Referring to a first state 1201 of FIG. 12, the electronic device 101 may display a text saying "I would like to use my voice as Bixby" through a display of the electronic device 101 to induce a user to input an utterance. While the user makes an utterance for the text saying that "I would like to use my voice as Bixby," the electronic device 101 may display a display of "Recording . . . " indicating that an utterance is being received, through a display.

In an embodiment, the electronic device 101 may determine whether the user input is not less than a threshold value. The electronic device 101 may determine whether the user input is not less than a threshold value, by comparing the converted text with the utterance-induced text. The threshold value may be set or may be determined depending on the performance of the electronic device 101. When determining that the user input is less than the threshold value, the electronic device 101 may display a display for requesting the user's utterance input again.

When the user's utterance input is completed, the electronic device 101 may display a second state 1202 through the display. The electronic device 101 may display "Completed" indicating that an input is completed, through the display, instead of a display of 'Recording . . . ' indicating that the reception of an utterance for a text saying that "I would like to use my voice as Bixby."

Figure 13:
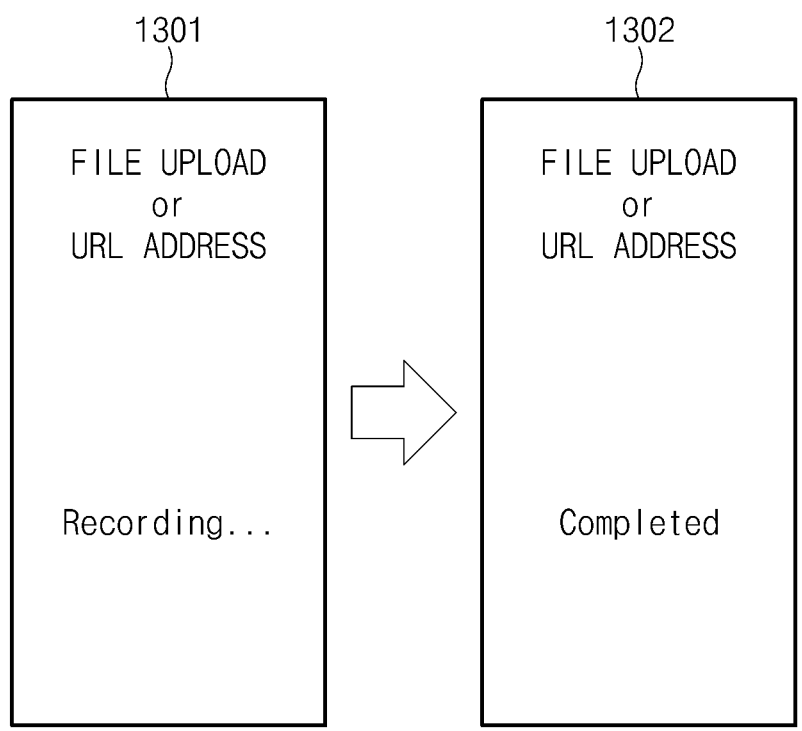
FIG. 13 is a diagram of a method, in which an electronic device processes an input for uploading a user input, in detail, a user's voice input by inducing the user's utterance, according to an embodiment of the disclosure.

FIG. 13 is a diagram of a method, in which the electronic device 101 processes an input for uploading a user input, in detail, a user's voice input by inducing the user's utterance, according to an embodiment of the disclosure.

Referring to a first state 1301 of FIG. 13, the electronic device 101 may display a text of "file upload or URL address" through a display of the electronic device 101 to induce a user to upload a voice file. While the user uploads the voice file, the electronic device 101 may display a display of "Recording . . . " indicating reception of an input through the display.

In an embodiment, the electronic device 101 may determine whether a voice input of the voice file is not less than a threshold value, by analyzing the file through the user input. The threshold value may be set or may be determined depending on the performance of the electronic device 101. When determining that the user input is less than the threshold value, the electronic device 101 may display a display for requesting the user's utterance input again.

When the user's utterance input is completed, the electronic device 101 may display a second state 1302 through the display. The electronic device 101 may display "Completed" indicating that an input is completed, through the display instead of a display of "Recording . . . " indicating that the user input is being received.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a processor; and
a memory operatively connected to the processor,
wherein the memory stores instructions that, when executed, cause the processor to:
receive a voice input of a user,
extract a feature from the voice input of the user,
select an acoustic model through comparison with the extracted feature, and
perform fine-tuning on the selected acoustic model based on an utterance-induced value, so that the selected acoustic model learns the feature of the voice input, and
wherein the utterance-induced value includes a threshold value for determining a similarity between an utterance-induced text and an obtained text.

2. The electronic device of claim 1, further comprising:
a voice receiving device,
wherein the instructions further cause the processor to:
receive the voice input of the user through the voice receiving device, determine whether a similarity corresponding to the voice input is greater than a threshold value, and in response to the similarity corresponding to the voice input being greater than the threshold value, extract the feature from the voice input.

3. The electronic device of claim 2, further comprising:
at least one output device of a speaker or a display,
wherein the instructions further cause the processor to:
in response to the similarity corresponding to the voice input being less than the threshold value, output a message requesting a voice input again, through the at least one output device.

4. The electronic device of claim 1, further comprising:
a text-to-speech (TTS) module operatively connected to the processor,
wherein the instructions further cause the processor to:
load the selected acoustic model onto a decoder of the TTS module, and
perform fine-tuning on the decoder so that the selected acoustic model learns the feature of the voice input.

5. The electronic device of claim 1, further comprising:
a database,
wherein the instructions further cause the processor to:
compare the extracted feature with at least one acoustic model included in the database, and
select an acoustic model in the database having a highest similarity with the extracted feature.

6. The electronic device of claim 5, wherein the instructions further cause the processor to:
extract a latent vector from the voice input of the user, and
determine the similarity by comparing the latent vector with a latent vector of the at least one acoustic model included in the database.

7. The electronic device of claim 1, further comprising:
a sound model operatively connected to the processor,
wherein the instructions further cause the processor to:
receive a voice signal included in the voice input by using the sound model, and
wherein the sound model is learned by using a learning algorithm.

8. The electronic device of claim 1, wherein the instructions further cause the processor to:
identify a frequency of usage of the electronic device for each time zone, and
perform the fine-tuning at a time zone at which the frequency of usage is lowest.

9. The electronic device of claim 1, wherein the instructions further cause the processor to:
determine an accuracy of the fine-tuning, and
in response to the determined accuracy being lower than a threshold, complete the learning.

10. The electronic device of claim 1, further comprising:
an output device operatively connected to the processor,
wherein the instructions further cause the processor to:
provide a response through the output device by using the learned acoustic model.

11. A method performed by an electronic device, the method comprising:
receiving a voice input of a user;
extracting a feature from the voice input of the user;
selecting an acoustic model through comparison with the extracted feature; and
performing fine-tuning on the selected acoustic model based on an utterance-induced value, so that the selected acoustic model learns the feature of the voice input,
wherein the utterance-induced value includes a threshold value for determining a similarity between an utterance-induced text and an obtained text.

12. The method of claim 11, further comprising:
receiving the voice input of the user through a voice receiving device included in the electronic device or operatively connected to the electronic device;
determining whether a similarity corresponding to the voice input is greater than a threshold value; and
in response to the similarity corresponding to the voice input being greater than the threshold value, extracting the feature from the voice input.

13. The method of claim 12, further comprising:
in response to the similarity corresponding to the voice input being less than the threshold value, outputting a message requesting a voice input again, through at least one output device of a speaker or a display included in the electronic device or operatively connected to the electronic device.

14. The method of claim 11, further comprising:
loading the selected acoustic model onto a decoder of a text-to-speech (TTS) module included in the electronic device or operatively connected to the electronic device; and
performing fine-tuning on the decoder so that the selected acoustic model learns the feature of the voice input.

15. The method of claim 11, further comprising:
comparing the extracted feature with at least one acoustic model included in a database; and
selecting an acoustic model in the database having a highest similarity with the extracted feature.

16. The method of claim 15, further comprising:
extracting a latent vector from the voice input of the user; and
determining the similarity by comparing the latent vector with a latent vector of the at least one acoustic model included in the database.

17. The method of claim 11, further comprising:
receiving a voice signal included in the voice input by using a sound model,
wherein the sound model is learned by using a learning algorithm.

18. The method of claim 11, further comprising:
identifying a frequency of usage of the electronic device for each time zone; and
performing the fine-tuning at a time zone at which the frequency of usage is lowest.

19. The method of claim 11, further comprising:
determining an accuracy of the fine-tuning; and
in response to the determined accuracy being lower than a threshold, completing the learning.

20. The method of claim 11, further comprising:
providing a response by using the learned acoustic model through an output device included in the electronic device or operatively connected to the electronic device.

* * * * *